United States Patent
Ponson et al.

(10) Patent No.: US 6,464,060 B1
(45) Date of Patent: Oct. 15, 2002

(54) CLUTCH RELEASE BEARING SELF-ALIGNED BY A SLEEVE

(75) Inventors: Frédéric Ponson, Luynes; Hervé Girardin, Joue-les-Tours; Christophe Houdayer; Benoit Arnault, both of Tours, all of (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/700,114

(22) PCT Filed: May 20, 1999

(86) PCT No.: PCT/FR99/01193

§ 371 (c)(1),
(2), (4) Date: Nov. 13, 2000

(87) PCT Pub. No.: WO99/61812

PCT Pub. Date: Dec. 2, 1999

(30) Foreign Application Priority Data

May 27, 1998 (FR) ............................................ 98 06686

(51) Int. Cl.[7] ................................................. F16D 23/14
(52) U.S. Cl. ........................ 192/98; 192/110 B; 384/612
(58) Field of Search .............................. 192/98, 110 B, 192/30 V; 384/612

(56) References Cited

U.S. PATENT DOCUMENTS

| | | | |
|---|---|---|---|
| 4,013,327 A | * 3/1977 | Kunkel et al. | 384/615 |
| 4,352,419 A | * 10/1982 | Olschewski et al. | 192/98 |
| 4,365,850 A | * 12/1982 | Perrichot et al. | 384/611 |
| 4,838,402 A | 6/1989 | Feser | 192/98 |
| 5,113,988 A | 5/1992 | Caron | 192/98 |
| 5,156,248 A | * 10/1992 | Caron | 192/98 |
| 6,126,324 A | * 10/2000 | Ponson et al. | 384/612 |

FOREIGN PATENT DOCUMENTS

| | | | |
|---|---|---|---|
| DE | 37 09 237 | 9/1988 | |
| EP | 0 807 775 | 11/1997 | |
| FR | 2 663 702 | 12/1991 | |
| GB | 2 045 380 A | * 10/1980 | ............... 192/98 |
| GB | 2 045 381 | 10/1980 | |
| JP | 1-255724 A | * 10/1989 | ............ 192/110 B |
| JP | 6-213251 A | * 8/1994 | |

OTHER PUBLICATIONS

English Translation of PCT International Preliminary Examination Report (PCT/IPEA/409) for PCT/FR99/01193.

* cited by examiner

*Primary Examiner*—Richard M. Lorence
(74) *Attorney, Agent, or Firm*—Smith, Gambrell & Russell

(57) ABSTRACT

The invention concerns a clutch release bearing comprising an antifriction bearing (1) provided with a rotating ring (5) and a non-rotating ring (10), and mounted on a control element (2) provided with a tubular part (3) and a radial flange (4) whereon is urged to rest a radial portion of the non-rotating ring (10), and a self-aligning sleeve (15) arranged between the non-rotating ring (10) and the control element (2). The self-aligning sleeve (15) is fixed by being clamped on a cylindrical shaft (13) of the member supporting it, and comprises a metal reinforcement (17) provided with a tubular portion radially delimited by two surfaces of revolution, one of the two surfaces being coated with an elastic substance forming self-aligning means.

20 Claims, 6 Drawing Sheets

CLUTCH RELEASE BEARING SELF-ALIGNED BY A SLEEVE

Figure 1:
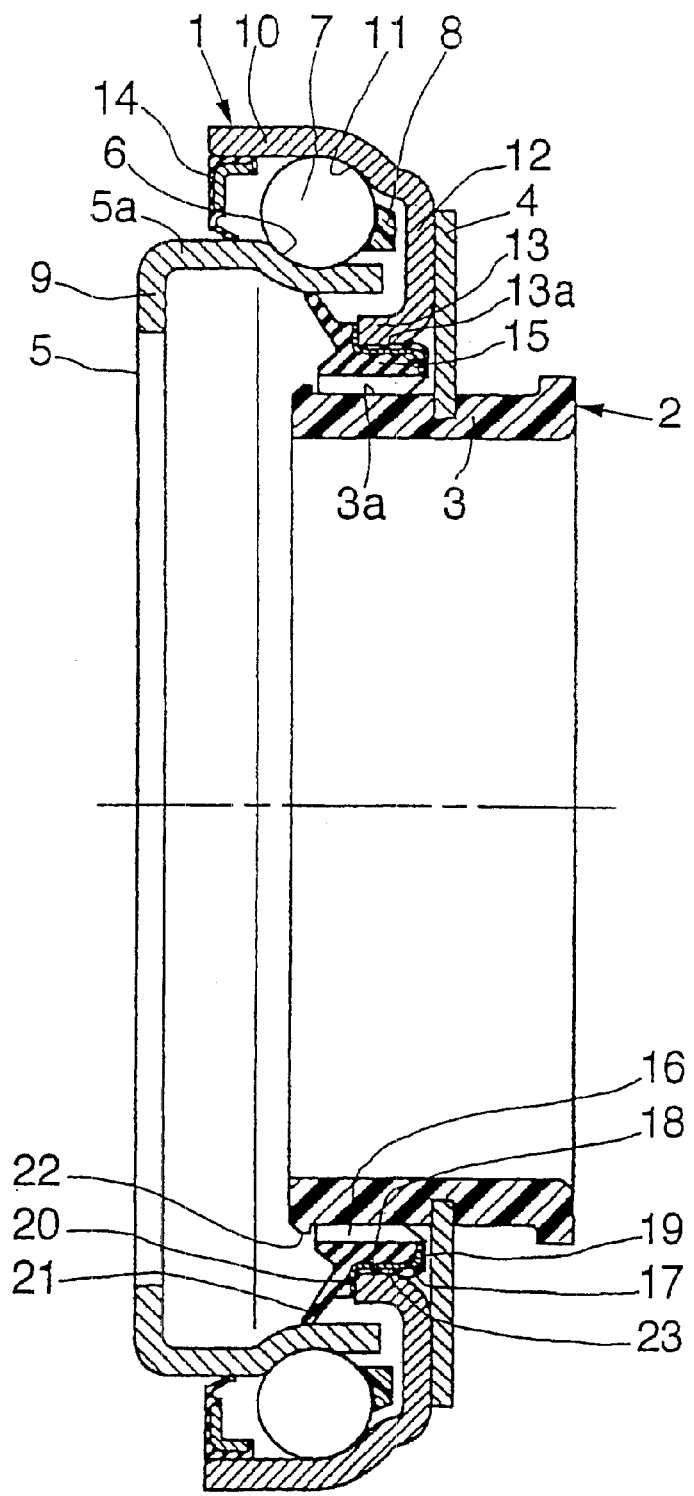

The present invention relates to the field of clutch release bearings, in particular for automobile vehicles, of the kind including a manoeuvring member which can be moved in translation by a control member such as a clutch release yoke or the piston of a hydraulic actuator, a thrust bearing adapted to operate on the clutch release mechanism of a clutch, such as a diaphragm spring, and a self-alignment elastic connecting member between the thrust bearing and the manoeuvring member providing an axial connection between the thrust bearing and the manoeuvring member and enabling the thrust bearing to centre itself relative to the diaphragm spring if the axis of the diaphragm spring and the axis of the thrust bearing are not exactly coincident at assembly time. A bearing of the above kind is described in the document FR-A-2 663 702 for example.

The self-alignment elastic connecting member is an elastic sleeve between the bore of the fixed race of the thrust bearing and a cylindrical bearing surface of the manoeuvring member. The sleeve, usually made of an elastomer or an equivalent flexible material, includes within its bore a plurality of ribs projecting in the radial direction relative to the bore and which extend axially across the width of the sleeve. These ribs are slightly inclined and take the form of blades whose free edges bear on the cylindrical bearing surface of the manoeuvring member. The ribs can therefore deform and allow the bearing to move in the radial direction relative to the manoeuvring member for self-alignment with the diaphragm in operation.

The self-alignment connecting elastic member is axially fastened to the fixed race of the thrust bearing by virtue of their complementary shapes, a radial flange or an annular bead at the rear extremity of the self-alignment connecting elastic member, opposite the diaphragm, co-operating with a stepped part of the bore in the race, and an annular groove formed at its front extremity co-operating with a radial rim of complementary shape on the inner race. An annular bead projecting from the free front extremity of the manoeuvring member forms an axial abutment for the axial extremity of the ribs of the sleeve.

The self-alignment elastic connecting member therefore also retains the thrust bearing on the manoeuvring member in the axial direction. In the assembly process, the elastic sleeve is first placed in the fixed race, and the manoeuvring member is inserted into the elastic sleeve by means of an axial movement, combined if necessary with a rotary movement to encourage flexing of the ribs of the sleeve. Slopes or bevels at the rear axial extremity of the ribs of the sleeve encourage the passage of the radial bead.

Although the above type of self-alignment sleeve is satisfactory in most applications, it can nevertheless cause problems if the bore in the inner race has a very short length in the axial direction and has no radial rim directed inwards at its front extremity and/or a stepped part in its bore. In this case, the axial fastening between the fixed race and the elastic sleeve is difficult to achieve, and when the manoeuvring member is fitted to the bearing equipped with the sleeve, unintentional axial movement of said sleeve can occur, leading to incorrect positioning of the sleeve relative to the surrounding members, with harmful consequences for subsequent operation of the release bearing. This problem is aggravated because it is difficult to detect this phenomenon because the elastic sleeve is housed between the bearing and the manoeuvring member.

The present invention aims to solve this problem by proposing a sleeve which retains all of its self-alignment capability but which can be firmly held inside the fixed race, even if the axial dimensions of the fixed race are very small and it does not have any rim directed inwards for locking the sleeve in the axial direction.

The clutch release bearing according to the invention is of the type including a rolling bearing which has a rotating race and a fixed race, and mounted on a manoeuvring member which has a tubular part and a radial flange on which a radial portion of the fixed race bears, and a self-alignment sleeve disposed between the fixed race and the manoeuvring member, the self-alignment sleeve being clamped to a cylindrical bearing surface of the member which supports it, and including a metal armature which has a tubular portion delimited in the radial direction by two circular section surfaces, one of the two surfaces being covered with the elastic material forming self-alignment means, characterized in that the other surface of the metal armature is at least partly covered with the synthetic material forming means for clamping to the member which supports the sleeve, the tubular part of the armature being at the level of the cylindrical bearing surface of the support member of the sleeve. The metal armature ensures that the sleeve is sufficiently rigid.

The self-alignment sleeve can be supported by the manoeuvring member or by the fixed race. In either case, all that is required is for the support member to have a short cylindrical bearing surface. The clamping effect is sufficient to prevent all risk of misalignment and incorrect positioning of the sleeve.

In one embodiment of the invention, the elastic material of the sleeve separating the tubular part of the armature and the support member of the sleeve is thin, for example having a thickness between that of the armature and three times the thickness of the armature.

The armature is advantageously extended by a sealing portion with the rotating race. The armature can be extended at both extremities by a sealing portion with the rotating race.

In one embodiment of the invention, the armature abuts axially against a radial surface of the support member of the sleeve.

The sleeve advantageously includes axial force-fitting ribs on its support member.

The self-alignment sleeve can include an annular bead adapted to form an axial abutment between the fixed race and the manoeuvring member.

The sleeve can include means for filtering vibrations separating the radial flange and the fixed race. The sleeve can include sealing means adapted to cooperate with the periphery of the outer race.

The elastic covering of the sleeve separating the tubular part of the armature and its support member absorbs the spread of dimensions and the relatively large deformations inherent to the process of fabricating components such as the races of the bearing by stamping on a press and heat treatment, whereas direct force-fitting of the armature to the race would require better control of dimensions and a more costly fabrication process if excessive or insufficient clamping were to be avoided in some cases. The proximity of the armature to the support member stiffens this whole area of the sleeve and enables force-fitting with sufficient force to prevent subsequent unintentional demounting of the sleeve. The sleeve is therefore effectively fixed either to the fixed race or to a cylindrical bearing surface of the manoeuvring member.

Figure 2:
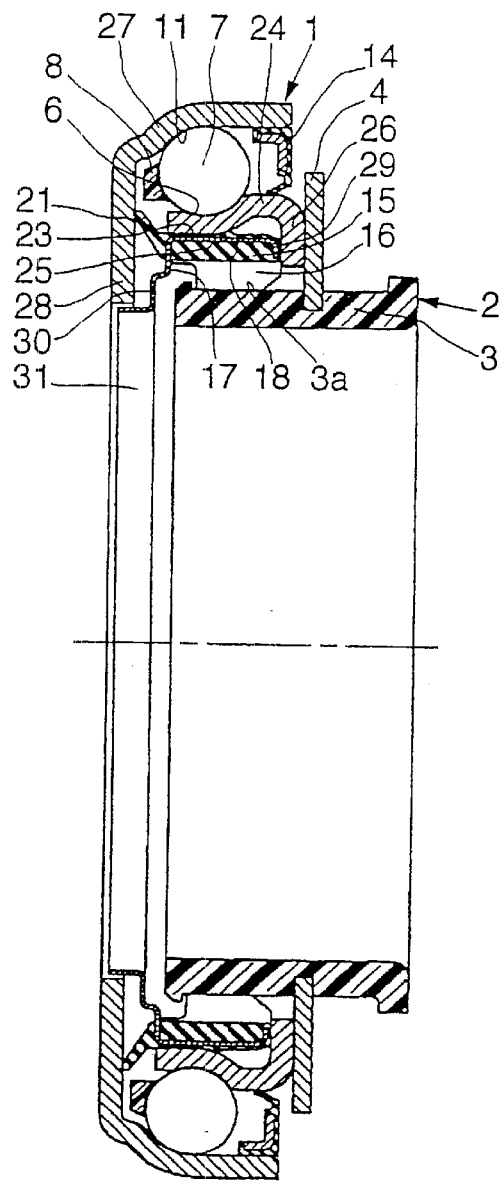
Figure 3:
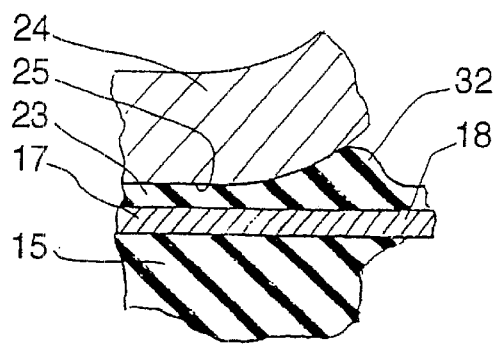
Figure 5:
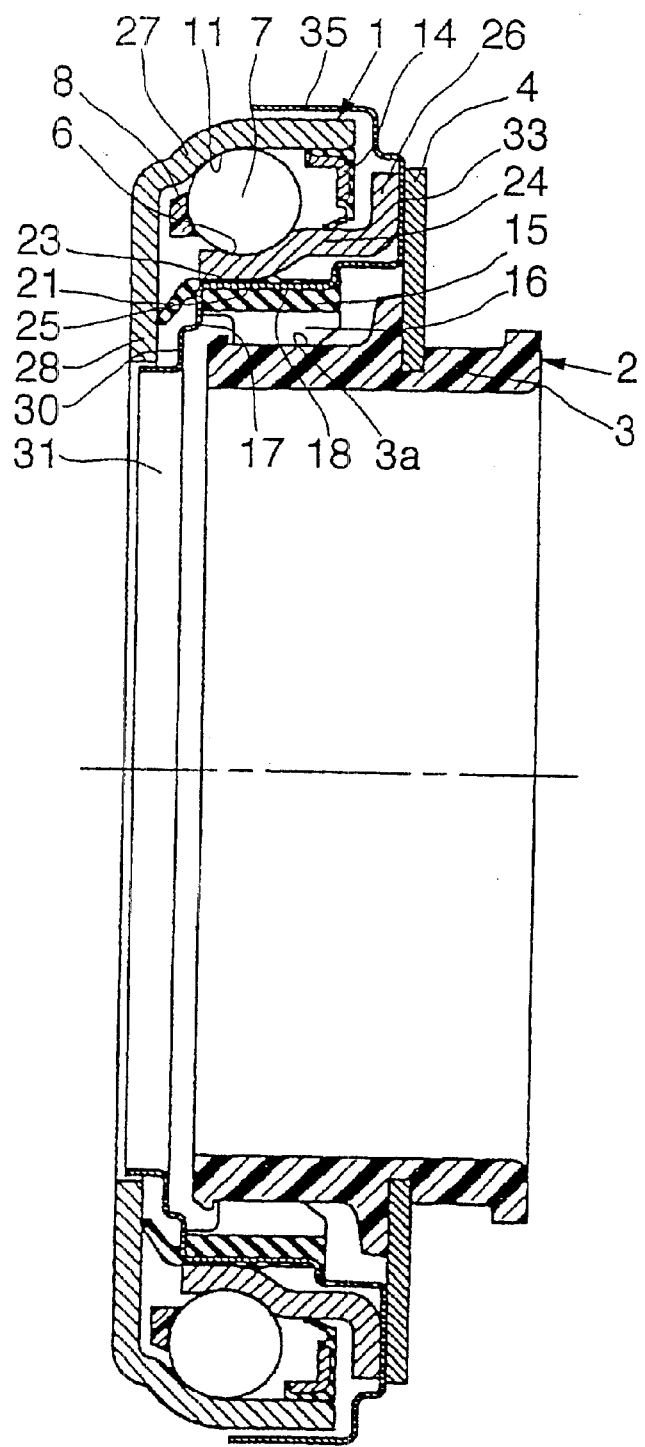
Figure 6:
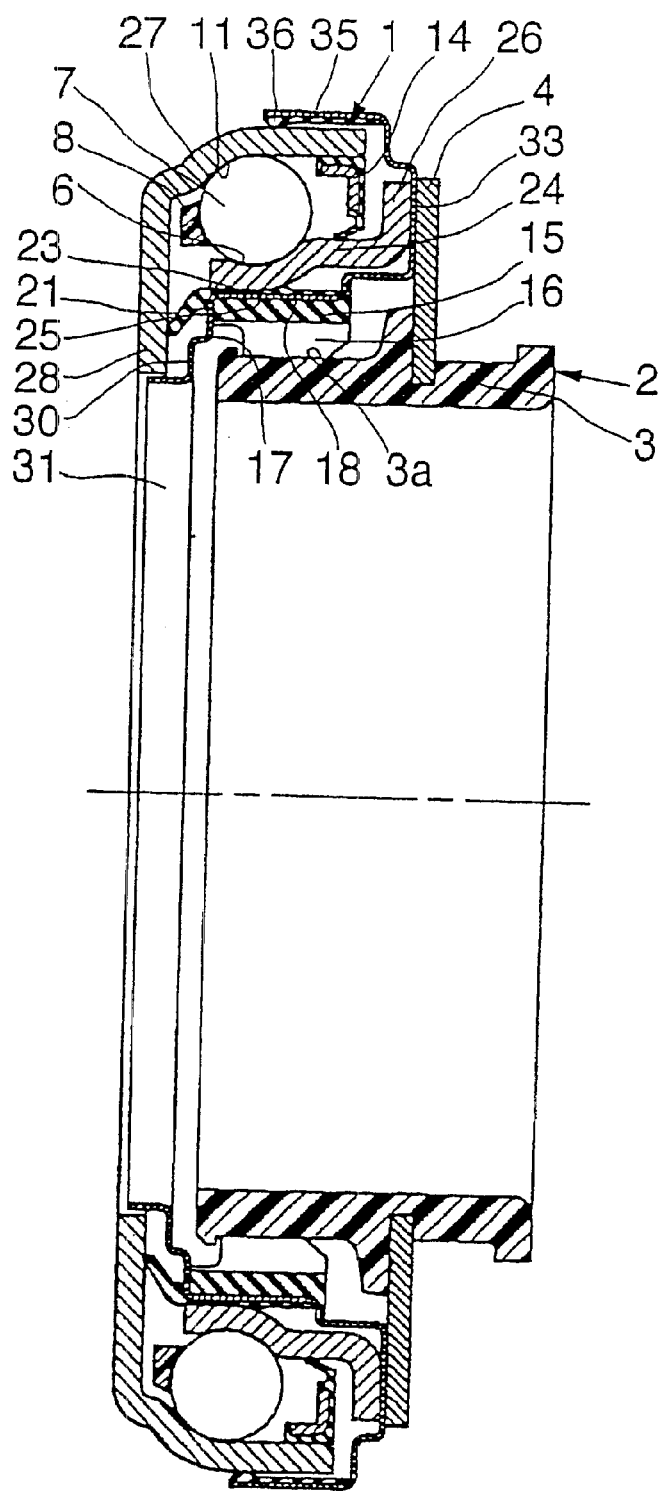
Figure 7:
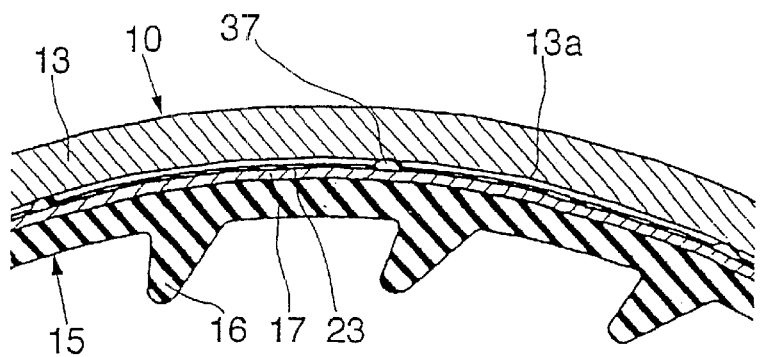
Figure 8:
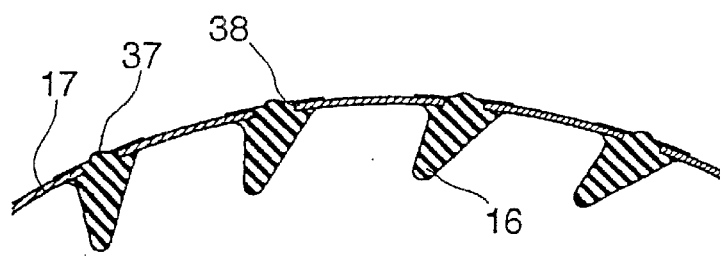
Figure 9:
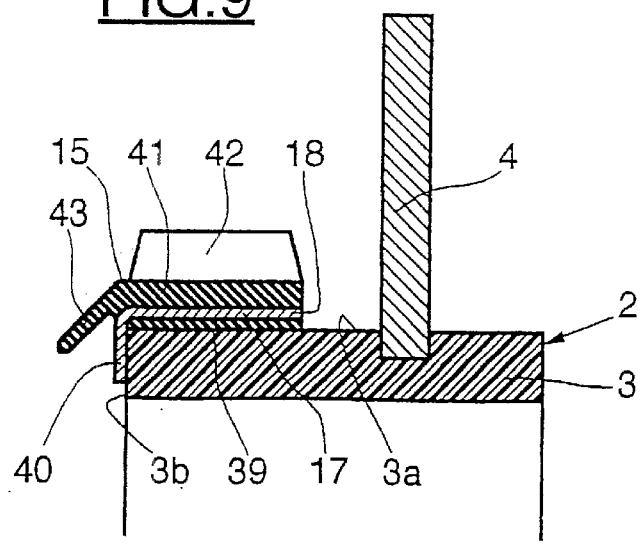

The present invention will be better understood and other advantages will become apparent on reading the detailed description of a few embodiments of the invention, shown by way of non-limiting example only in the accompanying drawings, in which:

FIG. 1 is a view of a thrust bearing according to the invention in axial section, FIG. 2 is a view similar to FIG. 1 of another embodiment of the invention, FIG. 3 shows a detail from FIG. 2, FIGS. 4 to 6 are views similar to FIG. 1 of different embodiments of the invention, FIG. 7 is a partial view in radial section of another embodiment of a clutch release bearing according to the invention, FIG. 8 is a partial view in radial section of another embodiment of a sleeve according to the invention, and FIG. 9 is a view in axial section of a sleeve in accordance with the invention mounted on manoeuvring member.

As shown in FIG. 1, the clutch release bearing according to the invention includes a rolling bearing 1 mounted on a manoeuvring member 2 which includes a tubular portion 3 which can slide relative to a guide tube, not shown, and a radial flange 4. The radial flange 4 of the manoeuvring member 2 is formed by a metal ring over which the cylindrical portion 3 is moulded. The radial flange 4 is preferably surface-hardened and provides a contact surface for an actuator member, not shown, which applies a force in the axial direction to move the clutch release bearing as a whole to release the clutch.

The rolling bearing includes a thin-wall inner race stamped from sheet metal or tube and which includes a toroidal track 6 for a row of balls 7 held in a cage 8. The inner race 5 also has a tubular extension 5a directed away from the radial flange 4 and terminating in a radial rim 9 adapted to rub on fingers of a clutch diaphragm spring, not shown.

The rolling bearing 1 also includes a thin-wall outer race 10 stamped from sheet metal or tube and which includes a toroidal track 11 for the balls 7 and a radial portion 12 directed inwards which rubs on the radial flange 4 and which is extended, at its free inner extremity, by a cylindrical rim 13 directed away from the radial flange 4, between the inner race 5 and the cylindrical portion 3 of the manoeuvring member 2 in the radial direction. A sealing member 14 is force-fitted into the bore of the outer race 10 in the vicinity of the track 11 and rubs against the tubular extension 5a.

A self-alignment sleeve 15 is disposed between the cylindrical portion 3 and the cylindrical rim 13 of the outer race 10. The elastic sleeve 15 is made from an elastomer or natural rubber, for example, and has a plurality of self-alignment ribs 16 parallel to the axis of the clutch release bearing, directed inwards and with the inside free edge in contact with the outside surface 3a of the cylindrical portion 3 of the manoeuvring member 2, which is made from a rigid synthetic material, for example a synthetic material to which mineral charges or the like have been added.

The elastic sleeve 15 incorporates an annular metal armature 17 which has a cylindrical portion 18 axially in line with the cylindrical rim 13 and at a small radial distance from it, a radial portion 19 extending the cylindrical portion 18 on the same side as the radial flange 4, directed inwards and stiffening the armature, and a radial portion 20 extending outwards from the other side of the cylindrical portion 18 and coming into contact with the free extremity of the cylindrical rim 13, so forming an axial abutment. The cylindrical portion 18 and the radial portion 19 of the armature 17 are covered with elastic material. The elastic covering 23 between the cylindrical portion 18 and the bore 13a of the cylindrical rim 13 is thin, for example the same thickness as the sheet metal constituting the metal armature 17, or slightly thicker. The covering 23 cooperates with the armature 17 to produce an adequate retaining force in the bore 13a of the cylindrical rim 13, and the bore 13a therefore forms a cylindrical force-fit bearing surface.

The elastic sleeve 15 includes an annular lip 21 which seals the rolling bearing 1 by coming into contact with the rotating inner race 5 and extends outwards in the radial direction and axially away from the radial flange 4 from the radial portion 20 of the metal armature 17. An annular rib 22 at the extremity of the cylindrical portion 3 retains the bearing 1 on the guide bush 2 before it is mounted on the guide tube. To this end, the front extremity of the ribs 16 is substantially perpendicular to the axis of the clutch release bearing to prevent disassembly. The sleeve 15 is thus force-fitted onto the cylindrical rim 13 of the fixed race 10, where it is perfectly centred and held. Its axial positioning is guaranteed by the contact between the radial portion 20 of the metal armature 17 and the front face of the cylindrical rim 13.

The embodiment shown in FIG. 2 is similar to the previous one except that the inner race 24 is fixed and includes a cylindrical bore 25 into which the sleeve 15 is force-fitted and a radial rim 26 directed inwards and in contact with the radial flange 4. The rotating outer race 27 has a radial rim 28 directed inwards and adapted to co-operate with a clutch diaphragm spring, not shown.

The metal armature 17 of the sleeve 15 has a radial portion 29 extending inwards from the cylindrical portion 18 and at a short distance from the radial rim 26 of the inner race 24. It is nevertheless covered with a thin layer of rubber or elastomer. Instead, there could be direct contact between the radial portion 29 and the radial rim 26. This forms a reference surface enabling accurate axial positioning of the sleeve 15 relative to the fixed race 24. On the side opposite the flange 4, the armature 17 is extended by a stepped portion 30 which terminates in a cylindrical portion 31 at a short distance from the free extremity of the radial rim 28 of the outer race 27, with which it forms a narrow passage to improve the sealing of the bearing 1.

As can be seen in FIG. 3, an annular bead 32 is provided by an increased thickness portion of the coating 23 separating the cylindrical portion 18 of the metal armature 17 and the inner race 24 at the limit of the bore 25. The bead 32 therefore co-operates with a rounded surface of the inner race 24, which improves retention of the sleeve 15 relative to the fixed race 24 in the axial direction by preventing any return movement of the sleeve 15 at the end of the force-fitting movement due to the elasticity of the covering 23 and to its adhesion to the bore 25.

Figure 4:
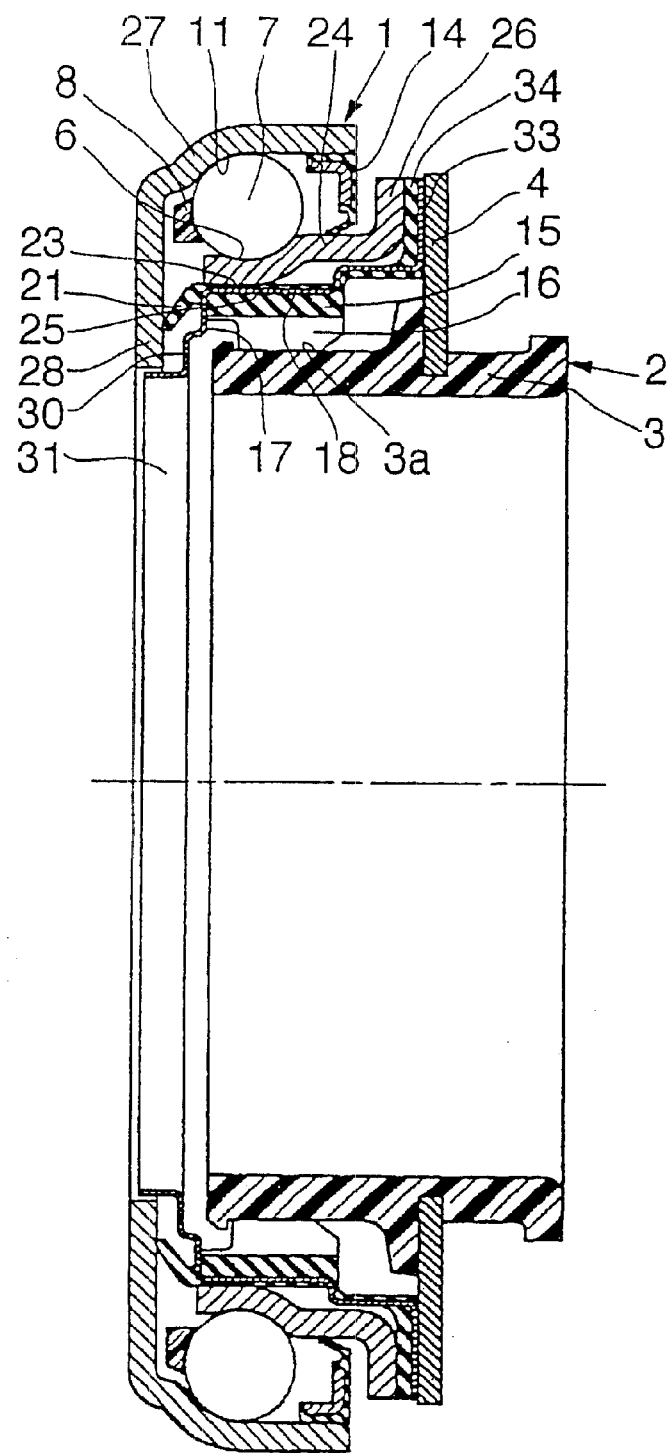

The embodiment shown in FIG. 4 is similar to that shown in FIG. 2 except the radial rim 26 of the fixed inner race 24 is oriented outwards. The armature 17 of the sleeve 15 is extended by a radial portion 33 disposed between the radial flange 4 and the radial rim 26, in direct contact with the radial flange 4. The radial portion 33 is separated from the radial rim 26 by a covering 34 moulded in one piece with the remainder of the sleeve 15. This achieves excellent filtering and damping of vibrations of the clutch release bearing 1, which can significantly reduce the transmission of vibration and noise between the engine/gearbox and the passenger compartment of the vehicle.

The embodiment shown in FIG. 5 is similar to that shown in FIG. 4 except the sleeve 15 has no covering 34 and the radial portion 33 is directly in contact on one side with the radial flange 4 and on the other side with the radial rim 26 of the fixed inner race 24. The radial portion 33 is extended outwards by a cylindrical portion 35 around the outer race 27 and forming therewith a narrow passage which improves the sealing of the rolling bearing 1.

In the FIG. 6 variant, the cylindrical portion 35 has an elastic covering 36, which is moulded onto it, for example, forming a sealing lip in rubbing contact with the cylindrical outside surface of the outer race 27.

FIG. 7 shows in particular the force-fitting between the sleeve 15 and a fixed race cylindrical bearing surface, for example the bore 13a of the cylindrical rim 13 of the fixed race 10 from FIG. 1. For better control of the force-fitting forces between the elastic sleeve 15 and the fixed race 10, and to limit those forces to reasonable values, parallel axial elastic material splines 37 are provided on the outside surface of the covering 23 separating the cylindrical part 18 of the armature 17 and the cylindrical rim 13. This reduces the area of contact between the elastic material and the steel of the race 10 and therefore achieves sufficient retention without excessive force-fitting forces.

FIG. 8 shows an embodiment which can be used for an application in which the cost of the material used for the flexible material of the sleeve 15 is high, for example in the case of fluorinated elastomers for use at high temperatures. It is then necessary to reduce greatly the quantity of material needed. A metal armature 17 is used which has perforations 38 both for anchoring the flexible material and for allowing it to circulate during moulding. Axial force-fitting ribs 37 are moulded onto the outside of the armature 17 and flexible ribs 16 onto the inside, the axial force-fitting ribs 37 and the ribs 16 being moulded in line with the perforations 38. The remaining surface of the armature 17 is not covered with elastomer, which saves material and weight.

This embodiment further produces an extremely compact thrust bearing, especially in the radial direction, compared to a conventional thrust bearing.

The sleeve 15 can also be located on the cylindrical part 3 of the guide bush 2, see FIG. 9. The sleeve then includes a metal insert 17 which has a cylindrical portion 18 surrounding the outside surface 3a of the cylindrical part 3 and separated from it by an elastic covering 39 and a radial portion 40 on the opposite side of the radial flange 4 and extending inwards, coming into contact with the front face 3b of the cylindrical part 3, to guarantee accurate axial positioning of the sleeve 15 relative to the guide bush 2. The outside surface 3a of the cylindrical part therefore forms a cylindrical force-fitting bearing surface for the sleeve. The sleeve 15 also has a covering 41 around the cylindrical portion 18 and of which the outwardly oriented self-alignment ribs 42 are part. A sealing lip 43 is provided which comes into contact with the outer race of the bearing, not shown.

The invention provides a sleeve adapted to be disposed between a manoeuvring member and a rolling bearing and fixed to a short cylindrical support portion. The risk of incorrect positioning of the sleeve likely to lead to defective operation of the clutch is eliminated. Finally, the resulting clutch release bearing is very compact and economical to manufacture.

What is claimed is:

1. A clutch release bearing comprising a rolling bearing which has a rotating race and a non-rotating race provided with a radial portion, and mounted on a maneuvering member which has a tubular part and a radial flange on which the radial portion of the non-rotating race bears, and a self-alignment sleeve disposed between the non-rotating race and the maneuvering member and supported on a support member of one of the non-rotating race and maneuvering member with the self-alignment sleeve being clamped to a cylindrical bearing surface of the support member, the self-alignment sleeve comprising an elastic material and a metal armature which has a tubular portion delimited in the radial direction by two circular section surfaces, one of the two surfaces being covered with the elastic material forming self-alignment means, the other surface of the metal armature being at least partly covered with the elastic material forming means for clamping said self-alignment sleeve to the support member, and the tubular part of the armature being axially in line with the cylindrical bearing surface of the support member.

2. The bearing according to claim 1, wherein the support member supporting the self-alignment sleeve is provided by the maneuvering member.

3. The bearing according to claim 1, wherein the support member supporting the self-alignment sleeve is provided by the non-rotating race.

4. The bearing according to claim 2, wherein the elastic material of said sleeve separating the tubular portion of the armature and the support member has a thickness between that of the armature and three times the thickness of the armature.

5. The bearing according to claim 2, wherein the armature is extended by a sealing portion with the rotating race.

6. The bearing according to claim 2, wherein the armature is extended at both extremities by a sealing portion with the rotating race.

7. The bearing according to claim 2, wherein the armature abuts axially against a radial surface of the support member.

8. The bearing according to claim 2, wherein the sleeve includes axial force-fitting ribs.

9. The bearing according to claim 1, wherein the self-alignment sleeve includes an annular bead adapted to form an axial abutment between the non-rotating race and the maneuvering member.

10. The bearing according to claim 2, wherein the sleeve includes means for filtering vibrations separating the radial flange and the non-rotating race.

11. The bearing according to claim 1, wherein the sleeve includes sealing means adapted to co-operate with the periphery of an outer fixed race.

12. The bearing according to claim 1, wherein the cylindrical bearing surface of the support member comprises a bore surface of said non-rotating race.

13. The bearing according to claim 1, wherein a relative position of said tubular portion of said armature to the support member and a thickness of the elastic material on said other surface of said metal armature defines a force fit relationship between said self-alignment sleeve and the support member.

14. The bearing according to claim 1, wherein the elastic material is a synthetic material.

15. The bearing according to claim 1, wherein the elastic material of said sleeve separating the tubular portion of the armature and the support member has a thickness between that of the armature and three times the thickness of the armature.

16. The bearing according to claim 1, wherein said self alignment means includes self-aligning ribs and the elastic material of said sleeve separating the tubular portion of the armature and the support member has a radial thickness less than that of said ribs.

17. The bearing according to claim 1, wherein said self-alignment means includes a plurality of ribs which radially extend and contact the cylindrical bearing surface of the support member.

18. The bearing according to claim 1, wherein the armature is extended at both extremities by a sealing portion with the rotating race.

19. The bearing according to claim 1, wherein the armature abuts axially against a radial surface of the support member.

20. The bearing according to claim 1, wherein the sleeve includes means for filtering vibrations separating the radial flange and the non-rotating race.

* * * * *